(12) United States Patent
Tong et al.

(10) Patent No.: US 8,101,689 B2
(45) Date of Patent: *Jan. 24, 2012

(54) SHAPE MEMORY EPOXY COPOLYMER

(75) Inventors: Tat Hung Tong, Bellbrook, OH (US); Benjamin J. Vining, Dayton, OH (US); Richard D. Hreha, Beavercreek, OH (US); Thomas J. Barnell, Centerville, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/090,760

(22) PCT Filed: Dec. 15, 2006

(86) PCT No.: PCT/US2006/062179
§ 371 (c)(1),
(2), (4) Date: Apr. 18, 2008

(87) PCT Pub. No.: WO2007/070877
PCT Pub. Date: Jun. 21, 2007

(65) Prior Publication Data
US 2008/0269420 A1 Oct. 30, 2008

Related U.S. Application Data

(60) Provisional application No. 60/750,502, filed on Dec. 15, 2005.

(51) Int. Cl.
*C08L 63/00* (2006.01)
*C08L 63/02* (2006.01)

(52) U.S. Cl. ........ 525/523; 525/107; 525/113; 525/396; 525/398; 525/423; 525/438; 525/454; 525/463; 525/471; 525/472; 525/525; 525/526; 525/527

(58) Field of Classification Search ........................ None
See application file for complete search history.

(56) References Cited

U.S. PATENT DOCUMENTS

| | | | |
|---|---|---|---|
| 3,349,053 A * | 10/1967 | Ashby | 528/407 |
| 5,145,935 A | 9/1992 | Hayashi | |
| 5,189,110 A | 2/1993 | Ikematu et al. | |
| 5,506,300 A | 4/1996 | Ward et al. | |
| 5,665,822 A | 9/1997 | Bitler et al. | |
| 6,720,402 B2 | 4/2004 | Langer et al. | |
| 6,759,481 B2 | 7/2004 | Tong | |
| 6,986,855 B1 | 1/2006 | Hood et al. | |
| 2008/0021166 A1 * | 1/2008 | Tong et al. | 525/241 |
| 2008/0262188 A1 * | 10/2008 | Xie et al. | 528/98 |

FOREIGN PATENT DOCUMENTS
WO PCT/US2006/062179 6/2007

OTHER PUBLICATIONS

CAS registry No. 2238-07-5 for bis(2,3-epoxyproyl)ether, 1964, one page.*

* cited by examiner

Primary Examiner — Robert Sellers
(74) Attorney, Agent, or Firm — Dinsmore & Shohl LLP

(57) ABSTRACT

The shape memory polymers disclosed are a reaction product of at least one reagent containing two active amino-hydrogen or two active phenolic-hydrogen with at least one multifunctional cross linking reagent which contains at least three or more active amino- or phenolic-hydrogen or is a reagent containing at least three glycidyl ether moieties which is then further mixed with at least one diglycidyl ether reagent whereupon the resulting mixture is cured and has a glass transition temperature higher than 00 C. This reaction creates crosslinking between the monomers and polymers such that during polymerization they form a crosslinked thermoset network.

33 Claims, No Drawings

SHAPE MEMORY EPOXY COPOLYMER

CROSS-REFERENCE TO RELATED APPLICATIONS

This application claims priority from provisional application, Ser. No. 60/750,502 filed Dec. 15, 2005, which application is incorporated herein by reference.

BACKGROUND OF THE INVENTION

1. Technical Field

The present invention is directed to the manufacture of epoxy based shape memory polymers (SMPs), their production and use. More particularly, the current invention comprises a reaction mixture of at least one monofunctional amine reagent with at least one cross linking multifunctional amine reagent which is then further mixed with at least multifunctional epoxide whereupon the resulting mixture is cured.

The present invention is specifically drawn toward applications which currently use epoxy resin. The need for an epoxy SMP that is obvious to those of skill in the art. The present invention is also drawn to a shape memory polymer thermosetting resin having compatibility with polymers employed in high temperature, high strength and high tolerance processes in manufacturing.

2. Background Art

Shape memory materials are materials capable of distortion above their glass transition temperatures ($T_g$s), storing such distortion at temperatures below their $T_g$ as potential mechanical energy in the material, and release this energy when heated again to above the $T_g$, returning to their original "memory" shape.

The first materials known to have these properties were shape memory metal alloys (SMAs), including TiNi (Nitinol), CuZnAl, and FeNiAl alloys. These materials have been proposed for various uses, including vascular stents, medical guide wires, orthodontic wires, vibration dampers, pipe couplings, electrical connectors, thermostats, actuators, eyeglass frames, and brassiere underwires. With a temperature change of as little as 10° C., these alloys can exert a stress as large as 415 MPa when applied against a resistance to changing its shape from its deformed shape. However, these materials have not yet been widely used, in part because they are relatively expensive.

Shape memory polymers (SMPs) are being developed to replace or augment the use of SMAs, in part because the polymers are light weight, high in shape recovery ability, easy to manipulate, and economical as compared with SMAs. SMPs are materials capable of distortion above their glass transition temperature ($T_g$), storing such distortion at temperatures below their $T_g$ as potential mechanical energy in the polymer, and release this energy when heated to temperatures above their $T_g$, returning to their original memory shape. When the polymer is heated to near its transition state it becomes soft and malleable and can be deformed under resistances of approximately 1 MPa modulus. When the temperature is decreased below its $T_g$, the deformed shape is fixed by the higher rigidity of the material at a lower temperature while, at the same time, the mechanical energy expended on the material during deformation will be stored. Thus, favorable properties for SMPs will closely link to the network architecture and to the sharpness of the transition separating the rigid and rubbery states.

Heretofore, numerous polymers have been found to have particularly attractive shape memory effects, most notably the polyurethanes, polynorbornene, styrene-butadiene copolymers, and cross-linked polyethylene.

In literature, SMPs are generally characterized as phase segregated linear block co-polymers having a hard segment and a soft segment, see for example, U.S. Pat. No. 6,720,402 issued to Langer and Lendlein on Apr. 13, 2004. As described in Langer, the hard segment is typically crystalline, with a defined melting point, and the soft segment is typically amorphous, with a defined glass transition temperature. In some embodiments, however, the hard segment is amorphous and has a glass transition temperature rather than a melting point. In other embodiments, the soft segment is crystalline and has a melting point rather than a glass transition temperature. The melting point or glass transition temperature of the soft segment is substantially less than the melting point or glass transition temperature of the hard segment. Examples of polymers used to prepare hard and soft segments of known SMPs include various polyacrylates, polyamides, polysiloxanes, polyurethanes, polyethers, polyether amides, polyurethane/ureas, polyether esters, and urethane/butadiene copolymers.

The limitations with these are other existing shape memory polymers lie in the thermal characteristics and tolerances of the material. The $T_g$ of a material may be too low for the conditions in which the system will reside, leading to the material being incapable of activation. An example of such a situation is an environment with an ambient temperature exceeding the transition temperature of the SMP; such a climate would not allow the polymer to efficiently make use of its rigid phase. Additionally, current organic systems from which SMPs are synthesized are not capable of operating in adverse environments that degrade polymeric materials. An example of such an environment is low earth orbit, where intense radiation and highly reactive atomic oxygen destroy most organic materials.

Applications for a shape memory material capable of withstanding these harsh conditions as well as higher thermal loads include, but are not limited to; morphing aerospace structures and space compatible polymers capable of self-actuation and dampening.

As discussed in Langer, SMP can be reshaped and reformed multiple times without losing its mechanical or chemical properties. When the SMP described by Langer is heated above the melting point or glass transition temperature of the hard segment, the material can be shaped. This (original) shape can be memorized by cooling the SMP below the melting point or glass transition temperature of the hard segment. When the shaped SMP is cooled below the melting point or glass transition temperature of the soft segment while the shape is deformed, a new (temporary) shape is fixed. The original shape is recovered by heating the material above the melting point or glass transition temperature of the soft segment but below the melting point or glass transition temperature of the hard segment. The recovery of the original shape, which is induced by an increase in temperature, is called the thermal shape memory effect. Properties that describe the shape memory capabilities of a material are the shape recovery of the original shape and the shape fixity of the temporary shape.

Conventional shape memory polymers generally are segmented polyurethanes and have hard segments that include aromatic moieties. U.S. Pat. No. 5,145,935 to Hayashi, for example, discloses a shape memory polyurethane elastomer molded article formed from a polyurethane elastomer polymerized from of a dysfunctional diisocyanate, a difunctional polyol, and a difunctional chain extender.

Examples of additional polymers used to prepare hard and soft segments of known SMPs include various polyethers, polyacrylates, polyamides, polysiloxanes, polyurethanes, polyether amides, polyurethane/ureas, polyether esters, and urethane/butadiene copolymers. See, for example, U.S. Pat. No. 5,506,300 to Ward et al.; U.S. Pat. No. 5,145,935 to Hayashi; and U.S. Pat. No. 5,665,822 to Bitler et al.

Several physical properties of SMPs other than the ability to memorize shape are significantly altered in response to external changes in temperature and stress, particularly at the melting point or glass transition temperature of the soft segment. These properties include the elastic modulus, hardness, flexibility, vapor permeability, damping, index of refraction, and dielectric constant. The elastic modulus (the ratio of the stress in a body to the corresponding strain) of an SMP can change by a factor of up to 200 when heated above the melting point or glass transition temperature of the soft segment. Also, the hardness of the material changes dramatically when the soft segment is at or above its melting point or glass transition temperature. When the material is heated to a temperature above the melting point or glass transition temperature of the soft segment, the damping ability can be up to five times higher than a conventional rubber product. The material can readily recover to its original molded shape following numerous thermal cycles, and can be heated above the melting point of the hard segment and reshaped and cooled to fix a new original shape.

Recently, SMPs have been created using reactions of different polymers to eliminate the need for a hard and soft segment, creating instead, a single piece of SMP. The advantages of a polymer consisting of a single crosslinked network, instead of multiple networks are obvious to those of skill in the art. The presently disclosed invention uses this new method of creating SMPs. U.S. Pat. No. 6,759,481 discloses such a SMP using a reaction of styrene, a vinyl compound, a multifunctional crosslinking agent and an initiator to create a styrene based SMP.

The industrial use of SMPs has been limited because of their low transition temperatures. Epoxy resins are a unique class of material which possesses attractive thermal and mechanical properties. Epoxy resins polymerize thermally producing a highly dense crosslinked network. Typically these thermoset epoxy networks are rigid and have low strain capability. By altering this network system, it is possible to produce a lightly crosslinked network still possessing many of the original materials properties but with the functionality of a shape memory polymer. Currently there is no epoxy based SMP available.

High temperature, high toughness thermoset resins with shape memory characteristics are not currently available. Other high temperature, high toughness, thermoset resins do not have shape memory. Typically, epoxy resins do not exhibit the shape memory effect mentioned above. In order to exhibit this shape memory effect epoxy resins must be crosslinked in a manner different from normal epoxy resins. It is this new method of crosslinking epoxy resins that is highly sought after.

BRIEF SUMMARY OF THE INVENTION

The epoxy based shape memory polymers (SMPs) that are described in this application are well adapted for industrial use in making SMP Molds, as set forth in U.S. Pat. No. 6,986,855 issued to Hood and Havens on Jan. 17, 2006, or for use in other industrial and manufacturing processes.

As previously stated, SMPs are a unique class of polymers that can harden and soften quickly and repetitively on demand. This feature provides the ability to soften temporarily, change shape, and harden to a solid structural shape in various new highly detailed shapes and forms.

SMPs have a very narrow temperature span in which they transition from hard to soft and back again. Additionally it is possible to manufacture the SMP such that the activation of the SMP occurs over a very narrow temperature range, typically less than 5 degrees Celsius. This narrow glass transition temperature ($T_g$) range is a key property that allows a SMP to maintain full structural rigidity up to the specifically designed activation temperature. SMPs possessing these properties, such as described here, are particularly useful in applications that will change shape at some stage but need the structure to stay rigid at higher operating temperatures, typically greater than 0° C., such as morphing aerospace structures and SMP molding processes.

In accordance with the present invention, the SMPs disclosed are a reaction product of at least one of each of the following reagents. The first reagent contains two active amino-hydrogens or two active phenolic-hydrogens. The second reagent is a multifunctional cross-linking reagent which contains at least three active amino- or phenolic-hydrogens or is a reagent containing at least three glycidyl ether moieties. The reaction mixture of the first reagent and second reagent is then further mixed with the third reagent, which contains at least one diglycidyl ether reagent whereupon the resulting mixture is cured and has a glass transition temperature higher than 0° C. This reaction creates cross-linking between the monomers and polymers such that during polymerization they form a cross-linked thermoset network.

Therefore it is an object of the present disclosure to provide an epoxy-based polymer containing a crosslinked thermoset network which exhibits the shape memory effect described above.

DETAILED DESCRIPTION OF THE INVENTION

Generally, shape memory polymers (SMPs) are comprised of two essential components; the back bone polymer, which is comprised of monomeric constituents that undergo polymerization to produce polymers possessing specific glass transition temperatures ($T_g$s), and a crosslinking agent. The mixture of monomers can be formulated so that the glass transition temperatures can be tuned to meet different operational needs for specific applications.

In general, shape memory polymer (SMP) can be made with any polymer system by introduction of a small, but specific amount of crosslinking agent into the material. However, the exact chemistry to introduce this crosslinking into the material varies with different polymers. In the case of epoxy SMP, this can be achieved by using amine and phenol reagents that form linear polymer chain with the diepoxide (e.g. Bisphenol A diglycidyl ether, which is the most commonly available epoxy resin) and cured with small amount of crosslinking multifunctional amine, phenol or glycidyl ether reagents. In contrast, common epoxy resins are normally cured with stoichiometric amount of diamine crosslinking reagents. The use of these amine reagents ensures there is enough flexibility between the crosslinking points within the polymer materials, and this flexibility or mobility is what imparts the materials with shape memory properties.

The crosslink density is crucial in controlling the elongation and transition temperature ("$T_g$") of epoxy SMP. For most applications, the highest crosslink density possible is desired in order to maximize the $T_g$ and thereby the use of the material. A relatively low crosslink density is required in SMP materials to allow movement of epoxy chains, increasing elongation and shape memory properties. However, if too few crosslinkers are present, the material behaves as a thermoplastic, irreversibly deforming at elevated temperatures. Therefore one must be careful to find the optimum crosslink density that allows for maximum elongation with full retention of original form.

Crosslink density is defined as the number of moles of crosslinker divided by the total moles of the resin system. In formulation, balanced stoichiometry must be used, meaning that all reactive epoxide groups must have one active amino-hydrogen or phenolic-hydrogen to react with. Therefore, the monomers containing two active amino-hydrogen or phenolic-hydrogen serve as chain extenders while the multifunctional-amines, phenols, or glycidyl ethers serve as crosslinkers. In formulation, two equations must be solved simultaneously: one balancing all reactive groups and the other defining the crosslink density. Depending on the curing agents and epoxies used, crosslink densities ranging from 0.2 mol % to 10 mol % based on total number of moles.

Dissolving thermoplastics in epoxy resins is often performed to increase toughness. Often, solvents or kneading machines are used to adequately blend thermoplastics and epoxy resins. One approach that can be taken with epoxy SMP is in situ polymerization, where a thermoplastic modifier is polymerized during the cure of the epoxy resin. The thermoplastic polymerizes via a free-radical addition mechanism, while the epoxy polymerizes in an epoxide ring-opening reaction. This allows simple mixing of the two low viscosity resins: the thermoplastic monomers and the epoxy resin system. The $T_g$ of the original epoxy formulation is affected depending on the thermoplastic used and degree of polymerization. Styrene and acrylate monomers can used together and independently to tailor the $T_g$ of the material. The loading of initiator can also be modified to control the chain length of the thermoplastic molecules. The presence of the thermoplastic phase does not hinder the elongation of the epoxy matrix. Any loading is possible, although visible phase separation occurs above 10 weight percent for polystyrene systems.

All reagents that used to produce the epoxy-based SMP are commercially available; some are available in bulk scale. Some examples of reagents are as follows.

Amine reagents can be 2-amino-3-picoline, 2-amino-6-picoline, 2-aminopyridine, 3-aminopyridine, 4-aminophenol, 2-aminothiazole, 8-aminoquinoline, 8-naphthylamine, ethanolamine, o-anisidine, 2'-(2-aminoethoxy)ethanol, benzylamine, or propylamine, piperazine and substituted piperazines, e.g., 2-(methylamido)piperazine, 2-methylpiperazine, 2,5-dimethylpiperazine, 2,6-dimethylpiperazine, aniline and substituted anilines, e.g., 4-(methylamido)aniline, 4-methoxyaniline (p-anisidine), 3-methoxyaniline (m-anisidine), 2-methoxyaniline (o-anisidine), 4-butylaniline, 2-sec-butylaniline, 2-tert-butylaniline, 4-sec-butylaniline, 4-tert-butylaniline, 5-tert-butyl-2-methoxyaniline, 3,4-methoxyaniline, 3,4-dimethylaniline; alkyl amines and substituted alkyl amines, e.g., propylamine, butylamine, tert-butylamine, sec-butylamine, benzylamine; alkanol amines, e.g., 2-aminoethanol and 1-aminopropan-2-ol; and aromatic and aliphatic secondary diamines, e.g., 1,4-bis(methylamino)benzene, 1,2-bis(methylamino)ethane and N,N'-bis(2-hydroxyethyl)ethylenediamine, —N,N'-dibenzylethylenediamine; and other aromatic amines, e.g., 2-aminobenothiazole, 3-amino-5-methylpyrazole, 2-amino-6-methylpyridine, 3-aminophenol, 2-amino-3-picoline, 4-aminopyridine, 3-aminopyridine, 2-aminopyridine, 3-aminoquinoline, 5-aminoquinoline, 2-aminothiophenol Multifunctional cross-linking reagents can be tris(2,3-epoxypropyl)isocyanurate, glycerol propoxylate triglycidyl ether, 3,5-diethyltoluene-2,4-diamine and 3,5-diethyltoluene-2,6-diamine, methylenedianiline, diethylenetriamine, and tris(2-aminoethyl)amine. Difunctional epoxides can include diglycidyl ethers of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, catechol, 1,4-butanediol, 1,4-cyclohexanedimethanol, 1,2-cyclohexanedimethanol, 1,6-hexanediol, neopentyl glycol, and ethylene glycol. In specific embodiments, difunctional epoxides may include bis-(4-glycidyloxyphenyl)methane (bisphenol F), diglycidyl-1,2-cyclohexanedicarboxylate, resorcinol, diglycidylether, and N,N-diglycidylaniline.

In addition to using reagents containing active amino groups, it is also possible to use phenolic reagents containing active phenolic groups to produce epoxy-based SMP. Examples of these diphenol reagents include resorcinol, hydroquinone, 4,4'-isopropylidene bisphenol (bisphenol A), bis (4-hydroxyphenyl)-2,2-dichloroethylene (bisphenol C), bis (4-hydroxyphenyl)methane (bisphenol F), 4,4'-sulfonyldiphenol (bisphenol S), 4,4'-(9-fluorenylidene) diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, 4-tert-butylcatechol and catechol.

In addition it is possible to tune the mechanical properties such as toughness and $T_g$ of the epoxy SMP using thermoplastic. Thermoplastics are dissolved in epoxy resin systems to increase toughness, enhance self-healing properties, and modify other material properties. By incorporation the following commercial thermoplastics in epoxy SMP resin the mechanical and chemical properties of the final SMP can be tailored to specific design and environmental requirements: polystyrene, polysulfone, and polymethyl methacrylate. The following thermoplastics, and their copolymers, also have potential use in epoxy SMP: polyacrylonitrile, polybutylacrylate, polymethylmethacrylate, polybutadiene, polyoxymethylene (acetal), High impact polystyrene, polyamide, polybutylene terephthalate, polycarbonate, polyethylene, polyethylene terephthalate, polyetheretherketone, polyetherimide, polyethersulfone, polyphthalamide, polyphenylene ether, polyphenylene sulfide, polystyrene, polysulfone, polyurethane, polyester, and poly(styrene-acrylonitrile).

The current material system shows a great degree of strain (i.e. elongation) above $T_g$ as compared to those epoxy system that were published. The materials also show good stability significantly at least 60° C. above $T_g$, unlike the published material system which continues to cure above $T_g$ which leads to change of material properties each time the material is heated.

Several samples of the epoxy-based SMP were prepared, using either aniline, aminoethanol, p-anisidine, m-anisidine, 3-aminopyridine, 4-tert-butylcatechol, resorcinol, hydroquinone, bisphenol A as the reagents to react with methylenedianiline and bisphenol A diglycidyl ether. For aniline-based epoxy SMP, crosslinker content from about 0.5 mol % to 10 mol % was formulated.

MODES FOR CARRYING OUT THE INVENTION

The invention will now be further described with reference to a number of specific examples which are to be regarded solely as illustrative and not as restricting the scope of the invention.

Example 1

As an example, 1.08 g aniline (amine reagent) was mixed with 0.066 g of methylenedianiline (crosslinking diamine). The resulting solution was mixed with 4.17 g of bisphenol A diglycidyl ether to form an homogeneous solution. This solution was then injected into a glass mold, made with two, 2"×2" glass with a Viton O-ring sandwiched in between, by syringe. The resulting material was cured in an oven pre-heated to 125 C for 18 hours. This resulted in a clear solid shape memory polymer at room temperature that has a glass transition temperature (Tg) of about 104 C. The resulting material was also tough, as revealed by its resistance to cutting by razor blade hitting with a hammer, and with large elongation above its $T_g$, and excellent shape recovery. The rubbery modulus of this material was also significantly higher than the styrene-based SMP.

Example 2

For a resin system with a $T_g$ of 103° C., Bisphenol A diglycidyl ether at 78.94% weight is mixed with aniline at 19.88% weight and DETDA (major isomers: 3,5-diethyltoluene-2,4-diamine and 3,5-diethyltoluene-2,6-diamine) at 1.19% weight. All components are miscible liquids and are easily combined through mechanical mixing.

Example 3

For a resin system with a $T_g$ of 60° C., diglycidyl ether of Bisphenol A at 45.32% weight and 1,4-butanediol diglycidyl ether at 31.38% weight are mixed with aniline at 21.99% weight and DETDA (major isomers: 3,5-diethyltoluene-2,4-diamine and 3,5-diethyltoluene-2,6-diamine) at 1.31% weight. All components are miscible liquids and are easily combined through mechanical mixing.

While the amount of crosslinking reagents used can vary from 0.01 mol % to 10 mol % or more, it is particularly preferred to keep the amount between 0.2 mol % to 7.0 mol %. The amount of phenol or amine reagents will vary stoichiometrically with the epoxide reagents and each can vary from 35 mol % to 65 mol %. It is particularly preferred that both are in the range of 45 mol % to 55 mol %.

The glass transition temperature of the shape memory polymer can be also be tailored by altering the mixture of mono- and multi-functional amine reagents and the multi-functional epoxy resins. The transition temperature can also be tailored by the combination of different reagents and resins such that more than one reagent or resin is added to a single mixture. The resulting formulations all showed the ability to withstand strains from at least from 0-60% of their original size before critical deformation occurred. Additionally some formulations showed the ability to expand 0-700% of their original size before critical deformation occurred.

The first of two possible structures of the shape memory polymer prepared from the reaction mixtures described is as follows:

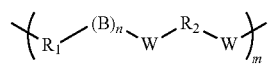

wherein B has the structure:

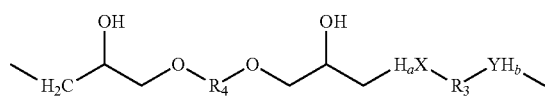

wherein W has the structure:

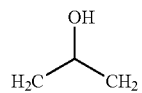

and wherein $R_1$ is a tri-functional, tetra-functional or penta-functional amine or aromatic ether moiety and may be the same or different between each group, and wherein $R_2$, $R_3$, and $R_4$, may be any aliphatic or aromatic monomeric unit or polymer and may be the same or different between or amongst each group, and wherein X and Y can be N or O and can be the same or different between or amongst each group, and wherein a and b can be 1 or 2, and wherein n and m can be any positive non-zero whole number.

The second structure of the shape memory polymer prepared from the disclosed reaction mixtures is as follows:

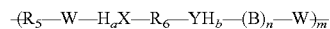

wherein B has the structure:

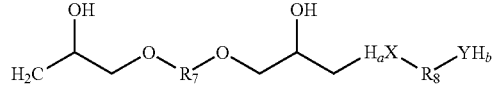

wherein W has the structure:

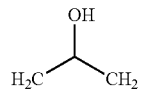

and wherein $R_5$ is a tri-functional, tetra-functional or penta-functional aromatic or aliphatic moiety and may be the same or different between each group, and wherein $R_6$, $R_7$, and $R_8$, may be any aliphatic or aromatic monomeric unit or polymer and may be the same or different between or amongst each group, and wherein X and Y can be N or O and can be the same or different between or amongst each group, and wherein a and b can be 1 or 2, and wherein n and m can be any positive non-zero whole number.

Finally, additional catalytic elements may be used to assist the reaction and lower the final cure temperature of the epoxy-based SMP. Some catalysts that could be used are: bis(triphenylphosphoranylidene) ammonium chloride, bis(triphenylphosphoranylidene)ammonium bromide, and bis(triphenuylphosphoranylidene)ammonium acetate.

INDUSTRIAL APPLICABILITY

The shape memory phenomenon in the vicinity of $T_g$ and the ability to set the value of $T_g$, by varying the composition, over a very broad range of temperatures allows contemplation of numerous applications in varied uses including, but not limited to, molds for contact lenses manufacturing, molds for composite manufacturing, structural deployment devices for remote systems, games and toys, domestic articles, arts and ornamentation units, medical and paramedical instruments and devices, thermosensitive instruments and security devices, office equipment, garden equipment, educative articles, tricks, jokes and novelty items, building accessories, hygiene accessories, automotive accessories, films and sheets for retractable housings and packaging, coupling material for pipes of different diameters, building games accessories, folding games, scale model accessories, bath toys, boots and shoes inserts, skiing accessories, suction-devices for vacuum cleaners, pastry-making accessories, camping articles, adaptable coat hangers, retractable films and nets, sensitive window blinds, isolation and blocking joints, fuses, alarm devices, sculpture accessories, adaptable hairdressing accessories, plates for braille that can be erased, medical prosthesis, orthopedic devices, furniture, deformable rulers, recoverable printing matrix, formable casts/braces, shoes, form-fitting spandex, form-fitting clothes, self-ironing clothes, self-fluffing pillow, deployable structures, space deployable structures, satellites, and pipe replacement for underground applications.

While certain features of this invention have been described in detail with respect to various embodiments thereof, it will, of course, be apparent that other modifications can be made within the spirit and scope of the invention, and it is not intended to limit the invention to the exact detail shown above except insofar as there defined in the appended claims.

What is claimed is:

1. A shape memory polymer consisting of a cured reaction mixture of at least one first reagent, at least one second reagent, and at least one third reagent;
   wherein the first reagent contains either:
      two active amino-hydrogens or two phenolic hydrogens
   wherein the second reagent is a multifunctional crosslinking reagent which contains:
      at least three or more active amino-hydrogens or phenolic-hydrogens, or
      at least three glycidyl ether moieties;
   wherein third reagent is a difunctional epoxide;
   whereupon the shape memory polymer has a glass transition temperature higher than 0° C.

2. The shape memory polymer of claim 1 wherein the reagent with two active amino-hydrogens or two active phenolic hydrogens is added in a percentage of approximately 35 mol % to 55 mol % based on the total number of moles of material in the shape memory polymer.

3. The shape memory polymer of claim 1 wherein the multifunctional crosslinking reagent is added in a percentage of approximately 0.01 mol % to 10.0 mol % based on the total number of moles of material in the shape memory polymer resin.

4. The shape memory polymer of claim 1 wherein the difunctional epoxide is selected from the group consisting of diglycidyl ethers of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, catechol, 1,4-butanediol, 1,4-cyclohexanedimethanol, 1,2-cyclohexanedimethanol, 1,6-hexanediol, neopentyl glycol, and ethylene glycol.

5. The shape memory polymer of claim 4 wherein the difunctional epoxide reagent is added in a percentage of approximately 35 mol % to 65 mol % based on the total number of moles of material in the shape memory polymer.

6. The shape memory polymer of claim 1 wherein the reaction mixture further includes at least one thermoplastic polymeric modifier.

7. The shape memory polymer of claim 6 wherein said polymeric modifier is selected from the group consisting of polystyrene, polysulfone, polymethyl methacrylate, polyacrylonitrile, polybutylacrylate, polymethylmethacrylate polybutadiene polyoxymethylene (acetal), High impact polystyrene, polyamide, polybutylene terephthalate, polycarbonate, polyethylene, polyethylene terephthalate, polyetheretherketone, polyetherimide, polyethersulfone, polyphthalamide, polyphenylene ether, polyphenylene sulfide, polystyrene, polysulfone, polyurethane, polyester, and poly(styrene-acrylonitrile).

8. The shape memory polymer of claim 1 wherein reagent with two active phenolic hydrogens is selected from the group consisting of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, 4-tert-butylcatechol and catechol.

9. The shape memory polymer of claim 8 wherein the reagent with two active phenolic-hydrogens is added in a percentage of approximately 35 mol % to 55 mol % based on the total number of moles of material in the shape memory polymer.

10. A shape memory polymer prepared from a reaction mixture said shape memory polymer having the structure:

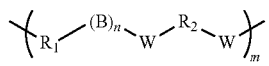

wherein B has the structure:

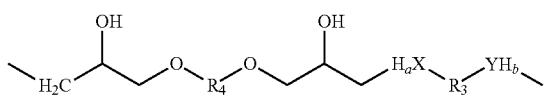

wherein W has the structure

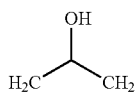

and wherein $R_1$ is an tri-functional, tetra-functional or penta-functional amine or aromatic ether moiety and may be the same or different between each group, and wherein $R_2$, $R_5$, and $R_4$, may by any aliphatic or aromatic monomeric unit or polymer and may be the same or different between or amongst each group, and wherein X and Y can be N or O and can be the same or different between or amongst each group, and wherein a and b can be 1 or 2, and wherein n and m can be any positive non-zero whole number.

11. A shape memory polymer prepared from a reaction mixture said shape memory polymer having the structure:

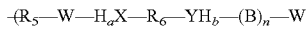

wherein B has the structure

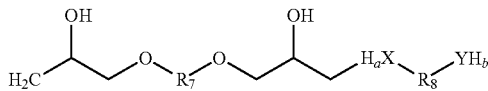

wherein W has the structure:

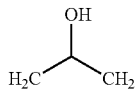

and wherein $R_5$ is an tri-functional, tetra-functional or penta-functional aromatic or aliphatic moiety and may be the same or different between each group, and wherein $R_6$, $R_7$, and $R_8$, may by any aliphatic or aromatic monomeric unit or polymer and may be the same or different between or amongst each group, and wherein X and Y can be N or O and can be the same or different between or amongst each group, and wherein a and b can be 1 or 2, and wherein n and m can be any positive non-zero whole number.

12. The shape memory polymer of claim 1 wherein the reagent with two active amino-hydrogen moieties is selected from the group consisting of piperazine and substituted piperazines, aniline and substituted anilines, alkyl amines and substituted alkyl amines, alkanol amines, and aromatic and aliphatic secondary diamines.

13. The shape memory polymer of claim 1 wherein
the piperazine and substituted piperazines are selected from the group consisting of 2-(methylamido)piperazine, 2-methylpiperazine, 2,5-dimethylpiperazine, and 2,6-dimethylpiperazine,
the aniline and substituted anilines are selected from the group consisting of aniline, 4-(methylamido)aniline, 4-methoxyaniline (p-anisidine), 3-methoxyaniline (m-anisidine), 2-methoxyaniline (o-anisidine), 4-butylamine, 2-sec-butylaniline, 2-tert-butylaniline, 4-sec-butylaniline, 4-tert-butylaniline, 5-tert-butyl-2-methoxyaniline, 3,4-dimethoxyaniline, and 3,4-dimethylaniline,
the alkyl amines and substituted alkyl amines are selected from the group consisting of propylamine, butylamine, tert-butylamine, sec-butylamine, and benzylamine,
the alkanol amines are selected from the group consisting of 2-aminoethanol and 1-aminopropan-2-ol, and
the aromatic and aliphatic secondary diamines are selected from group consisting of 1,4-bis(methylamino)benzene, 1,2-bis-(methylamino)ethane, N,N'-bis(2-hydroxyethyl)ethylenediamine, and N,N'-dibenzylethylenediamine, and 3-aminophenol, 4-aminopyridine, 3-aminopyridine, 2-aminopyridine, 2-aminothiophenol.

14. The shape memory polymer of claim 1 wherein the multifunctional crosslinking reagent is selected from the group consisting of tetraphenylolethane glycidyl ether, 4,4'-methylenebis(N,N diglycidylaniline), tris(2,3-epoxypropyl) isocyanurate, glycerol propoxylate triglycidyl ether, aromatic diamines, and aliphatic diamines.

15. The shape memory polymer of claim 1 whereupon the shape memory polymer has the ability to withstand strain of between 60% to 700% of the original size of the shape memory polymer before critical deformation.

16. The shape memory polymer of claim 1 whereupon the shape memory polymer has a crosslink density ranging from about 0.2% to about 10 mol %, based on the total number of moles.

17. A shape memory polymer comprising a cured reaction mixture of at least one first reagent, at least one second reagent, and at least one third reagent;
wherein the first reagent contains phenolic hydrogens
wherein the second reagent is a cross linking multifunctional reagent which contains:
at least three or more active amino-hydrogens or phenolic-hydrogens, or
at least three glycidyl ether moieties;
wherein third reagent is a difunctional epoxide;
whereupon the shape memory polymer has a glass transition temperature higher than 0° C., and has the ability to withstand strain of between 60% to 700% of the original size of the shape memory polymer before critical deformation.

18. The shape memory polymer of claim 17 wherein the first reagent comprises two active phenolic hydrogens moieties and is selected from the group consisting of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, 4-tert-butylcatechol and catechol.

19. The shape memory polymer of claim 17 wherein the first reagent comprises two active amino-hydrogen moieties and is selected from the group consisting of piperazine and substituted piperazines, aniline and substituted anilines, alkyl amines and substituted alkyl amines, alkanol amines, aromatic and aliphatic secondary diamines, and other aromatic amines.

20. The shape memory polymer of claim 17 wherein the shape memory polymer has the ability to withstand deformation of between 60% to 700% of the original size of the shape memory polymer before critical deformation.

21. The shape memory polymer of claim 17 whereupon the shape memory polymer has a crosslink density ranging from about 0.2% to about 10 mol %, based on the total number of moles.

22. The shape memory polymer of claim 17 wherein the reaction mixture further comprises catalyst selected from the group consisting of
bis(triphenylphosphoranylidene) ammonium chloride,
bis(triphenylphosphoranylidene)ammonium bromide, and
bis(triphenuylphosphoranylidene)ammonium acetate.

23. A shape memory polymer comprising a cured reaction mixture of at least one first reagent, at least one second reagent, and at least one third reagent;
wherein the first reagent contains either:
two active amino-hydrogens or two phenolic hydrogens, wherein the two active amino-hydrogen moieties are selected from the group consisting of piperazine and substituted piperazines, aniline and substituted anilines, alkyl amines and substituted alkyl amines, aromatic and aliphatic secondary diamines;
wherein the second reagent is a cross linking multifunctional reagent which contains:
at least three or more active amino-hydrogens or phenolic-hydrogens, or
at least three glycidyl ether moieties;
wherein third reagent is a difunctional epoxide;
whereupon the shape memory polymer has a glass transition temperature higher than 0° C.

24. The shape memory polymer of claim 23 comprising a cured reaction mixture of at least one first reagent, at least one second reagent, and at least one third reagent has the ability to withstand strain of between 60% to 700% of the original size of the shake memory polymer before critical deformation.

25. The shape memory polymer of claim 23 wherein the reaction mixture further comprises catalyst selected from the group consisting of
bis(triphenylphosphoranylidene)ammonium chloride,
bis(triphenylphosphoranylidene)ammonium bromide, and
bis(triphenylphosphoranylidene)ammonium acetate.

26. The shape memory polymer of claim 23 wherein the first reagent comprises two active phenolic hydrogens moieties and is selected from the group consisting of resorcinol, hydroquinone, 4,4'-isopropylidene bisphenol (bisphenol A), bis(4-hydroxyphenyl)-2,2-dichloroethylene (bisphenol C), bis(4-hydroxyphenyl)methane (bisphenol F), 4,4'-sulfonyldiphenol (bisphenol S), 4,4'-(9-fluorenylidene)diphenol, 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol K), 4,4'-dihydroxydiphenyl sulfide, 2,6-dihydroxynaphthalene, 1,3-dihydroxynaphthalene, 1,5-dihydroxynaphthalene, 1,6-dihydroxynaphthalene, 1,7-dihydroxynaphthalene, 2,7-dihydroxynaphthalene, 4-tert-butylcatechol and catechol.

27. The shape memory polymer of claim 23 wherein the first reagent comprises two active amino-hydrogen moieties and is selected from the group consisting of piperazine and substituted piperazines, aniline and substituted anilines, alkyl amines and substituted alkyl amines, alkanol amines, aromatic and aliphatic secondary diamines.

28. A shape memory polymer comprising a cured reaction mixture of at least one first reagent, at least one second reagent, at least one third reagent;
wherein the first reagent is selected from the group consisting of aniline, p-anisidine, m-anisidine, 3-aminopyridine, catechol, 4-tert-butylcatechol, resorcinol, hydroquinone, and bisphenol A
wherein the second reagent comprises a multifunctional crosslinking diamine;
wherein third reagent is a difunctional epoxide;
whereupon the shape memory polymer has a glass transition temperature higher than 0° C.

29. The shape memory polymer of claim 28 wherein the multifunctional crosslinking diamine comprises methylenedianiline.

30. The shape memory polymer of claim 28 wherein the first reagent comprises aniline.

31. The shape memory polymer of claim 28 wherein the first reagent comprises catechol.

32. The shape memory polymer of claim 28 wherein the third reagent comprises bisphenol A diglycidyl ether.

33. The shape memory polymer of claim 28 wherein the reaction mixture further comprises catalyst selected from the group consisting of
bis(triphenylphosphoranylidene)ammonium chloride,
bis(triphenylphosphoranylidene)ammonium bromide, and
bis(triphenylphosphoranylidene)ammonium acetate.

* * * * *

UNITED STATES PATENT AND TRADEMARK OFFICE
CERTIFICATE OF CORRECTION

| | | |
|---|---|---|
| PATENT NO. | : 8,101,689 B2 | Page 1 of 1 |
| APPLICATION NO. | : 12/090760 | |
| DATED | : January 24, 2012 | |
| INVENTOR(S) | : Tong et al. | |

It is certified that error appears in the above-identified patent and that said Letters Patent is hereby corrected as shown below:

On the Title page –

Item (57) ABSTRACT, Line 9, "transition temperature higher than 00C." should read --transition temperature higher than 0° C.--;

Col. 10, Line 29, Claim 7, "polymethylmethacrylate" should read --polymethylmethacrylate,--;

Col. 10, Line 30, Claim 7, "polybutadiene polyoxymethylene" should read --polybutadiene, polyoxymethylene--;

Col. 11, Line 15, Claim 10, "is an tri-functional" should read --is a tri-functional--;

Col. 11, Line 18, Claim 10, "may by" should read --may be--;

Col. 11, Line 44, Claim 11, "is an tri-functional" should read --is a tri-functional--;

Col. 11, Line 47, Claim 11, "may by" should read --may be--; and

Col. 13, Line 17, Claim 22, "bis(triphenuylphosphoranylidene) ammonium acetate" should read --bis(triphenylphosphoranylidene) ammonium acetate--.

Signed and Sealed this
Nineteenth Day of June, 2012

David J. Kappos
*Director of the United States Patent and Trademark Office*